Sept. 16, 1969     E. A. MUIJDERMAN     3,467,449
BEARING ELEMENT

Filed Dec. 4, 1967            2 Sheets-Sheet 1

INVENTOR
EVERHARDUS A. MUIJDERMAN

BY *Frank R. Trifari*
AGENT

United States Patent Office 3,467,449
Patented Sept. 16, 1969

3,467,449
BEARING ELEMENT
Everhardus Albertus Muijderman, Emmasingel, Eindhoven, Netherlands, assignor, by mesne assignments, to U.S. Philips Corporation, New York, N.Y., a corporation of Delaware
Filed Dec. 4, 1967, Ser. No. 687,582
Claims priority, application Netherlands, Dec. 7, 1966, 6617168
Int. Cl. F16c 35/08, 33/10
U.S. Cl. 308—9                          13 Claims

ABSTRACT OF THE DISCLOSURE

A hydrodynamic bearing for a shaft, having a running surface wetted by a lubricant supplied by grooves formed in the surface. Adjustment between the running surface and the shaft is achieved through the elasticity of the bearing element, and/or the resiliency of the connection between the bearing element and its supporting structure.

This invention relates to a bearing element for a hydrodynamic bearing.

In order to obtain an advantageous hydrodynamic action in a bearing, it is known per se to provide the bearing elements with shallow pumping grooves of, for example, spiral or helical shape. However, the manufacture of such bearing elements may involve problems. It is also known to manufacture cylindrical bearing elements of a non-metallic material. In this case a synthetic material is preferably used having a low friction coefficient with the rotary part of the bearing, no use being made of a lubricant. However, due to the frictional contact, a certain wear then occurs after a short or longer period. It is also possible to supply a lubricant, for example oil, to such a bearing element, the oil being brought through a deep oil supply groove to the running surface of the bearing element and spread over it. However, extremely accurate adjustment of the shaft relative to the bearing bush is then required. Difficulty may arise if the direction of the load on a shaft rotating in such a bush variable. In fact, as is generally known, the oil supply groove causes appreciable interference with the pressure rise in the lubricant at the area of the groove, which may result in frictional contact and hence in wear.

An object of the invention is to provide bearing elements which make possible an advantageous hydrodynamic action, which are simple and cheap to manufacture and for which the requirements of adjustment relative to a rotary bearing member are comparatively low. According to the invention, in order to attain this object, the bearing element comprises a slightly elastic body formed of a non-metallic material and the running surface of which is provided with at least three shallow pumping grooves which are entirely countersunk in the non-metallic material and equally oriented relative to the centre line of the bearing element and regularly distributed over the running surface, each groove having a width which is at least six times as large as its depth.

A somewhat elastic bearing element of a non-metallic material, such as synthetic material or rubber, having pumping grooves of shallow depth formed in its running surface affords important advantages relative to known bearing elements. The bearing elements may be manufactured, for example, by injection moulding during which process the grooves are also formed, which otherwise have to be obtained in a more complicated way. This permits a simple, rapid and cheap manufacture. Due to the shallow pumping grooves which are regularly divided over the running surface of the bearing element, the lubricant present in the gap of the bearing will considerably rise in pressure upon rotataion of a shaft co-acting with the bearing element. The pumping grooves ensure that lubricant is immediately supplied throughout the running surface right from the starting of the shaft. The pressure rise occurs throughout the running surface of the bearing element instead of only locally as in known bearings having a deep oil supply groove. Consequently the running surface of the slightly elastic bearing element can always match itself to the position of the rotating shaft without a possibility of contact being made between the shaft and the bearing element. In contrast with known bearing elements, moderate requirements only need be imposed upon the accuracy of mounting the bearing element. The depth of the pumping grooves depends inter alia upon the diameter of the running surface. For a large number of possibilities for use of the bearing element the depth of the groove will have a value between 5 and 50 microns. It will be evident that such shallow grooves the width of which is at least six times their depth, have the effect of a pressure rise, whereas the deep oil grooves of known bearings serve only as channels for supplying oil to the bearing surface. The bearing element may be manufactured in a simple manner, for example, by injection moulding, resulting in low manufacturing cost.

According to the invention, in one embodiment of the bearing element, the thickness of the non-metallic material under the grooves is at least ten times as great as the depth of the grooves.

In another embodiment of the invention, the thickness of the non-metallic material at the areas of the dams located between the grooves is at most twenty times as great as the depth of the grooves. Such a bearing element derives its somewhat elastic properties substantially from its shape, the specified thickness of the material at the dams notably making possible a flexible bearing element.

In another embodiment according to the invention the slightly elastic body has a thickness in a direction at right angles to the running surface which is, at least locally, at least a hundred times the depth of the grooves. In this embodiment the running surface can match itself to the position of a shaft supported by the bearing element due to the material of the bearing element, such as synthetic material or rubber, which itself has a certain elasticity, having a thickness which is great enough for elastically receiving the impression made by the film of lubricant.

According to the invention the bearing element will be formed as a body having at least one flat running surface in which the pumping grooves are formed. Such a bearing element is suitable to be used for axial support of a shaft.

In another embodiment according to the invention the bearing element is formed as a body having at least one cylindrical running surface formed with the pumping grooves. This embodiment permits advantageous radial bearing.

According to the invention, in order to obtain both an axial and a radial support for a shaft, the bearing element is formed as a body having a rotation-symmetrical tapered running surface in which the pumping grooves are formed. The running surface may be, for example, of a conical or spherical shape.

In one advantageous embodiment according to the invention the bearing element is provided with at least one projection extending substantially in the radial direction and integral with the bearing element. The projection, one end of which may be rigidly secured, provides an excellent possibility of adjustment for the bearing element, while the whole may be manufactured in a simple manner, for example, as a product of injection moulding.

In one embodiment according to the invention, in a bearing element provided with a plurality of radial projections, the outwardly directed end of each projection is provided with a thicker part. By means of these thicker parts the projections can be secured in a simple manner. In another embodiment of the invention the outwardly directed ends of the projections merge into a body surrounding the bearing element and integral with the bearing element and its projections.

In one embodiment of the invention the material of the bearing element, which preferably consists of synthetic material or rubber, includes finely-divided metal particles. By means of this step a more advantageous dissipation of heat may be obtained, if necessary.

According to the invention, in order to obtain greater mechanical rigidity, strengthening elements such as metal parts enclosing the material at least in part may be present in the material.

The bearing element naturally requires a sufficiently rigid support. To this end, the bearing element may be directly mounted in a construction or incorporated in a separate support which, in one embodiment of the invention, may have the form of a rigid body in which the bearing element is secured by means of a snap connection.

In another embodiment of the invention means are provided for preventing rotation of the bearing element in its support.

In order that the invention may be readily carried into effect several embodiments thereof will now be described in detail, by way of example, with reference to the accompanying diagrammatic drawings, in which:

FIGURE 2 is a sectional view of a bearing element in which axial forces and an angular adjustment can be elastically met with;

FIGURE 3b shows the bearing element having a shaft therein;

Figure 8:
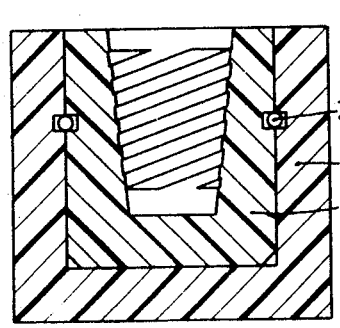
Figure 9:
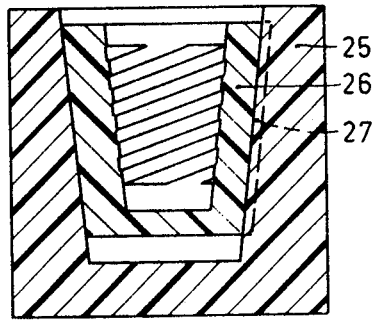
Figure 10:
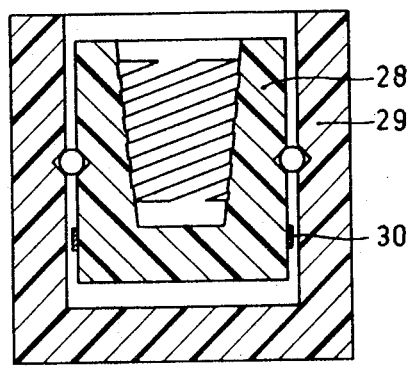
Figure 11:
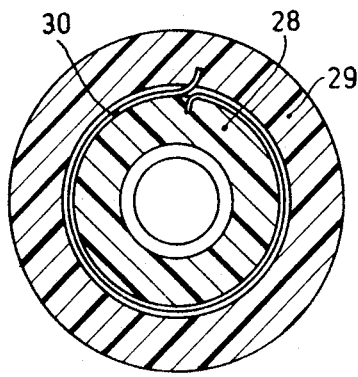

FIGURES 8 and 9 each show a cross-section of a bearing element housed in a rigid support;

FIGURE 10 shows a further embodiment of a bearing element fitted in a support and FIGURE 11 is a sectional view of a bearing element similar to that of FIGURE 10, in which means are provided for preventing rotation of the bearing element in its support.

Figure 1:
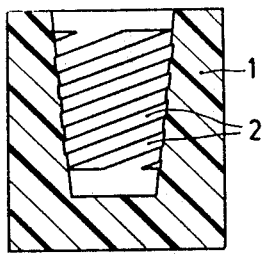
FIGURE 1 is a sectional view of a bearing element according to the invention.

FIGURE 1 shows a bearing element 1 for supporting the conical end of a shaft. A plurality of very shallow pumping grooves 2 is provided in the conical recess of the bearing element, which serves as a running surface. These grooves have a width which is at least six times as great as their depth. The depth of the pumping grooves depends inter alia upon the diameter of the running surface of the bearing element. Values between 5 and 50 microns are usual, although the pumping grooves can be deeper for a large diameter of the running surface. The shallow pumping grooves cause a material pressure rise in the lubricant upon rotation of the end of a shaft in the bearing element. A bearing obtained in this manner is referred to as "spiral groove bearing" and exhibits a very advantageous carrying capacity with an extremely low frictional loss. A suitable lubricant may be, for example, oil, grease, water, air or the like.

The bearing element is manufactured of a non-metallic material, such as a synthetic material. It may be made, for example, by injection moulding whereby the problem of forming the grooves is solved in a very simple manner. Rubber, for example, is also a suitable material.

Upon rotation of the conical end of a shaft in the bearing element the pumping grooves provide for supply of lubricant to the whole running surface right from the start and the pressure rise occurs in the lubricant throughout the running surface of the bearing element. Due to this pressure in the lubricant occurring throughout the surface there is always the possibility of a slight elastic matching of the running surface of the bearing element in case of a slightly wrong adjustment of the shaft without frictional contact occurring. In fact, the material of the bearing element has a sufficiently great elasticity so that the bearing element need not be fitted relative to the shaft with extreme accuracy.

Figure 2:
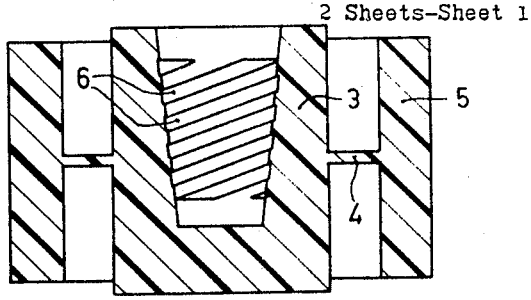

FIGURE 2 shows a bearing element having a conical body 3 which is formed with a projection in the form of a membrane 4 the outer periphery of which merges into an angular body 5 surrounding the conical body 3. The bearing element is again provided with shallow pumping grooves 6. The conical body 3, the membrane 4 and the annular body 5 form unit and may advantageously be made of synthetic material by injection moulding. By means of the angular member the bearing element can be fitted in a hole which may possibly have been drilled with great tolerance limits. The use of the membrane 4 results in an elastic connection for axial displacement and for matching to the position of the shaft, whereas the radial rigidity retains a sufficiently high value for the bearing. For certain uses the possibility of elastic axial displacement is very advantageous, namely if the bearing element is mounted with prestress against the end of the shaft.

Figure 3A:
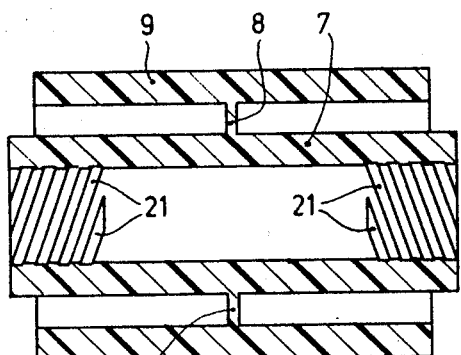
FIGURES 3a and 3b show a bearing element similar to that of FIGURE 2, but with a cylindrical running surface
Figure 3B:
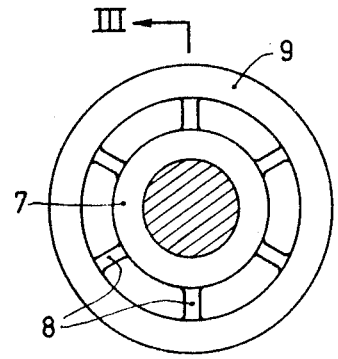

Instead of a membrane it is also possible to use spokes and the like. FIGURES 3a and 3b show an embodiment in which the bearing element consists of a cylindrical body 7 which is connected to an angular body 9 by means of spokes 8. The cylindrical body 7 has shallow pumping grooves 21 which act, for example, in relatively opposite directions. The pumping grooves have a multiple pitch.

Figure 4:
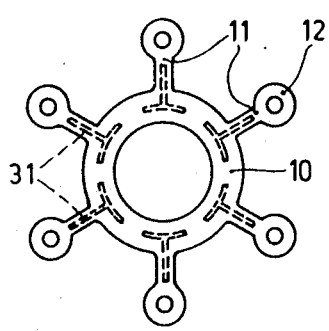
FIGURE 4 is an elevation view of another embodiment of a bearing element suitable for elastically meeting with axial forces and an angular adjustment.

When using a membrane, spokes or the like, it is not necessary for the outer ends of the membrane or the spokes to merge into an annular body. FIGURE 4 is an elevational view of a bearing element comprising a cylindrical body 10 formed with shallow pumping grooves and a plurality of projections 11. The outwardly directed ends of the projections are provided with thicker parts 12. The bearing element can be mounted with the aid of the thicker parts. To this end, each thicker part may have, for example, an aperture into which a pin or the like fits. It is also possible for the thicker parts to be formed as part of a known snap connection made of synthetic material.

Figure 5A:
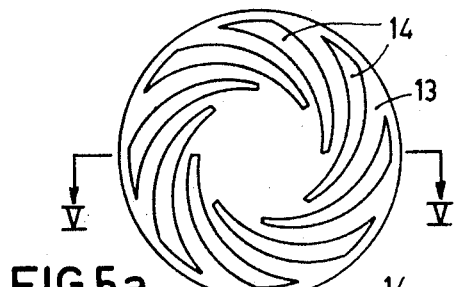
FIGURES 5a and 5b show a flat bearing with spiral grooves.
Figure 5B:
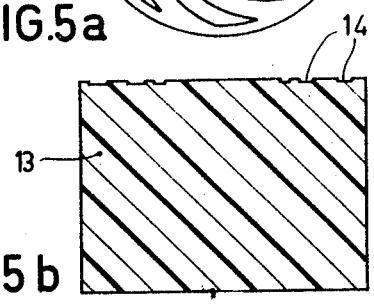
Figure 6:
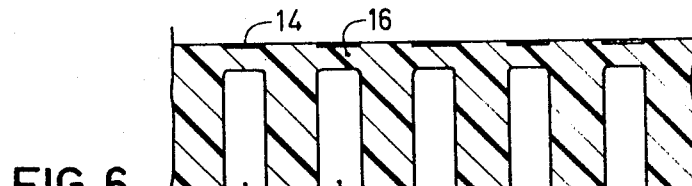
FIGURES 6 and 7 show a possible shaping in the non-metallic material of the bearing element.

The somewhat elastic matching of the running surface of the bearing element to the position of the shaft coacting with the bearing element is possible due to the shaping of the bearing element and the use of a suitable material. FIGURES 5a and 5b show a bearing element 13 having a flat running surface which is provided with spiral-shaped shallow grooves 14. The thickness of the bearing element at right angles to the running surface is at least a hundred times as great as the depth of the pumping grooves 14. The bearing element serves as a pivot bearing for the end of a shaft. If manufactured of, for example, slightly elastic synthetic material, the thickness of the bearing element ensures that the running surface can elastically match itself to a slightly inclined position of the extremity of the shaft. Such a bearing element can be formed with recesses 15, as shown in FIGURE 6, without influencing its advantageous action. The thickness of the material under the grooves 14, which material is indicated by 16, must be at least ten times as great as the depth of the grooves for obtaining sufficient mechanical rigidity.

Figure 7:
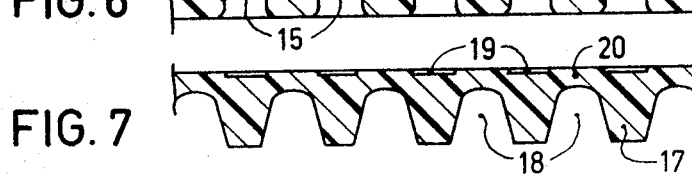

FIGURE 7 shows one embodiment of a part of a bearing element 17 in which recesses 18 are provided under the dams present between the pumping grooves 19. A particular choice may be made for the thickness of the material situated under the dams 20. If this thickness is less than twenty times the depth of the grooves it will be evident that, for example, in the embodiment shown in FIGURE 7, the elasticity of the bearing element is obtained substantially due to the flexibility of the thin parts. In this case the bearing element 6 thus acquires its slightly elastic property principally due to the particular shaping. A bearing element, of which FIGURE 7 shows a part, may have a flat running surface for absorbing axial forces. Other shapes are, however, also possible. Thus such shaping can also be used, for example, with a bearing element having a cylindrical running surface.

The bearing elements described can be mounted directly in a bore. However, it is also possible to secure the bearing element in a support as shown in FIGURES 8 to 11. FIGURE 8 shows a bearing element 12 which has been pressed into a metal support 23. A ring 24 prevents axial movement of bearing element 22 relative to the support 23. FIGURE 9 shows a support 25 the recess of which has a slightly conical shape, and a bearing element 26 which has a corresponding conical outer surface. The bearing element may thus be clampingly pushed into the support in a simple manner. A radial projection 27 connected to the bearing element then snaps into a groove of the support, resulting in additional locking against mutual rotation FIGURE 10 shows an embodiment in which a bearing element 28 is fitted in a support 29 while retaining a possibility of angular adjustment. In this embodiment locking against rotation may be obtained in the manner shown in FIGURE 11. In this case a spring 30 bound around bearing element 28 is secured at one end to the bearing element and at its other end to the support 29.

Finely-divided metal particles may be included, if necessary, in the material of the bearing element in order to obtain satisfactory dissipation of heat. Metallic strengthening parts, as indicated by 31 in FIGURE 4, can also be used.

What is claimed is:
1. A hydrodynamic bearing, comprising:
    a bearing element of an elastic material accommodating a shaft,
    at least one running surface in said bearing element, the surface defining therein equally spaced and symmetrical oriented grooves for supplying lubricant to the running surface, each groove having a width at least six times its depth, the depth being between 5 and 50 microns; and
    means for adjustably accommodating a shaft within the bearing element to permit elastic matching of the shaft with the running surface of the bearing element without causing frictional contact, said adjustment being due in part, to the elasticity of the material from which the bearing is molded.

2. The bearing as claimed in claim 1 further comprising:
    means for connecting the bearing element to a supporting structure, to prevent radial displacement of the bearing element with respect to the supporting structure.
3. The bearing as claimed in claim 2 wherein the connecting means comprises:
    at least one elastic projection member extending from the bearing element and secured to the supporting structure, to permit axial displacement of the bearing element and shaft therein, while preventing radial displacement.
4. The bearing as claimed in claim 3 wherein the elastic projection member is a spring.
5. The bearing as claimed in claim 4 further comprising:
    finely divided metal particles incorporated into the elastic material to dissipate heat.
6. The bearing as claimed in claim 1 wherein the running surface is flat.
7. The bearing as claimed in claim 6 wherein the grooves are spiral shaped.
8. The bearing as claimed in claim 1 wherein recessed portions are defined by the bearing structure directly under each groove, and the thickness of the material under each groove is at least ten times the depth of the groove, thereby achieving adjustable contact of the running surface with respect to the shaft, due to the flexibility of the thin recessed portions of the bearing structure.
9. The bearing as claimed in claim 1 wherein recessed portions are defined by the bearing structure under and between each groove, and the thickness of the material between each groove is less than twenty times the depth of the groove, thereby achieving adjustable contact of the running surface with respect to the shaft, due to the flexibility of the thin recessed portions of the bearing structure.
10. The bearing as claimed in claim 3 wherein the running surface is cylindrical.
11. The bearing as claimed in claim 10 wherein the grooves are helical shaped.
12. The bearing as claimed in claim 3 wherein the running surface is conically tapered.
13. The bearing as claimed in claim 12 wherein the grooves are helical shaped.

References Cited

UNITED STATES PATENTS

| | | | |
|---|---|---|---|
| 2,871,562 | 2/1959 | Kern. | |
| 2,899,243 | 8/1959 | Acterman | 308—9 |
| 2,983,832 | 5/1961 | Macks | 308—9 |
| 3,154,353 | 10/1964 | Haringx et al. | 308—9 |
| 3,265,452 | 8/1966 | Pan et al. | 308—9 |

MARTIN P. SCHWADRON, Primary Examiner

F. SUSKO, Assistant Examiner